(12) United States Patent
Webster et al.

(10) Patent No.: US 9,127,784 B2
(45) Date of Patent: Sep. 8, 2015

(54) DUCT ARRANGEMENT

(71) Applicant: ROLLS-ROYCE PLC, London (GB)

(72) Inventors: John Richard Webster, Derby (GB); Paul John Newton, Derby (GB); Paul Fletcher, Brinklow (GB)

(73) Assignee: ROLLS-ROYCE PLC, London (GB)

( * ) Notice: Subject to any disclaimer, the term of this patent is extended or adjusted under 35 U.S.C. 154(b) by 71 days.

(21) Appl. No.: 14/087,623

(22) Filed: Nov. 22, 2013

(65) Prior Publication Data

US 2014/0150919 A1 Jun. 5, 2014

(30) Foreign Application Priority Data

Dec. 5, 2012 (GB) .................................. 1221844.2

(51) Int. Cl.
*B63H 11/103* (2006.01)
*F16L 9/00* (2006.01)
*B63H 11/00* (2006.01)
*B63H 11/04* (2006.01)

(52) U.S. Cl.
CPC . *F16L 9/00* (2013.01); *B63H 11/00* (2013.01); *B63H 11/04* (2013.01); *B63H 11/103* (2013.01); *B63H 2011/004* (2013.01); *B63H 2011/043* (2013.01)

(58) Field of Classification Search
CPC . B63H 2011/043; B63H 20/28; B63H 11/103
USPC ........................................................ 440/38–47
See application file for complete search history.

(56) References Cited

U.S. PATENT DOCUMENTS

| 3,637,140 | A | * | 1/1972 | Palovchik | ................ 239/265.43 |
| 5,324,216 | A | * | 6/1994 | Toyohara et al. | ................ 440/47 |
| 5,910,032 | A | | 6/1999 | Gruenwald et al. | |
| 6,022,250 | A | | 2/2000 | Futaki et al. | |
| 6,981,902 | B1 | * | 1/2006 | Tafoya et al. | ................ 440/47 |

FOREIGN PATENT DOCUMENTS

| DE | 3120670 A1 | 12/1982 |
| EP | 2 505 488 A1 | 10/2012 |
| GB | 2489522 A | 10/2012 |

OTHER PUBLICATIONS

Apr. 4, 2013 Search Report issued in British Patent Application No. 1221844.2.

* cited by examiner

*Primary Examiner* — S. Joseph Morano
*Assistant Examiner* — Andrew Polay
(74) *Attorney, Agent, or Firm* — Oliff PLC (57) ABSTRACT

A duct arrangement 18 for a waterjet propulsor 10. The duct arrangement 18 comprises a main duct 30 having an inlet 20. The inlet 20 has an elongate main portion 32 extending along a principal axis 34, and at least one lateral portion 36 in fluid communication with the main portion 34. The at least one lateral portion 36 extends part way only along the length of the main portion 34.

20 Claims, 9 Drawing Sheets

DUCT ARRANGEMENT

FIELD OF THE INVENTION

The present disclosure relates to a duct arrangement. Particularly but not exclusively, the disclosure relates to a duct arrangement for a water jet propulsor.

BACKGROUND TO THE INVENTION

Waterjets are known for providing marine surface vessel propulsion. Waterjets provide more efficient operation in comparison to propellers at relatively high speeds, such as between 50 and 100 kilometers per hour. Waterjets operate by drawing water through a duct from an opening located below the waterline of the vessel, and exhausting a high speed jet of water at the rear of the vessel above the waterline. The reactive force of the jet of water provides a propulsive force.

In prior arrangements, the duct includes an intake arrangement comprising an opening which is flush with the submerged surface of the hull. This opening is the termination of an inclined duct leading upwardly to a pump impeller, which raises the water pressure and speed for discharge through the exhaust above the vessel's water line.

At low vessel speeds, water enters the intake from upstream, downstream and sideways directions. Generally, the upstream direction corresponds to the direction of travel of the water vessel, and the downstream direction corresponds to the opposite direction. At higher speeds the water entry is predominantly from the upstream direction due to the momentum of the approaching water in the reference frame of the vessel.

In order to provide greatest efficiency, a relatively larger intake aperture area is optimal at lower speeds in comparison to the optimal intake aperture area at higher speeds. A relatively small intake aperture area which is optimal for relatively high speed may lead to excessive turning of water around the lip at the downstream edge of the opening at low speed, leading to cavitation on an inner surface of the lip, within the duct. On the other hand, a relatively large intake aperture area which is optimal for relatively low speed may lead to excess water entering the duct at high speed, leading to cavitation on an outer surface of the lip, i.e. on the underneath of the hull. Such cavitation leads to reduced efficiency, and may in extreme cases lead to damage or reduced service life of the impellor, particularly where the cavitation occurs inside the duct.

Conventional intake designs therefore have an area which provides a compromise between low and high speed operation.

One solution to this problem is to provide a variable geometry intake. For example, U.S. Pat. No. 3,942,463 discloses a system comprising an intake duct having a flexible upper surface. The upper surface is actuated using bell cranks and pusher bars.

JP2000128080 discloses a system with movable sidewalls which can widen or narrow the aperture according to vessel speeds.

JP7101392 discloses a system with upper and lower parallel water jet ducts, with an obliquely frontward downward extendible and retractable moving scoop member to increase flow into the lower duct only at low vessel speeds.

However, each of these variable geometry systems adds further complexity and weight, and is vulnerable to foreign object damage, particularly at high speeds.

Relative positional terms such as "upstream", "downstream", "above" and "below" will be understood as referring to the in use orientation of the water vessel.

The present invention provides a duct arrangement for a waterjet that seeks to address some or all of the aforementioned problems.

SUMMARY OF THE INVENTION

Accordingly the present invention provides a duct arrangement for a waterjet propulsor, the duct arrangement comprising a main duct comprising an inlet, the inlet having an elongate main portion extending along a principal axis, and at least one lateral portion in fluid communication with the main portion, the at least one lateral portion extending part way only along the length of the main portion.

A duct arrangement in accordance with the invention will have an effective inlet area which varies in dependence on speed, such that the effective intake area is large at low speeds, and smaller at higher speeds. The effective intake area is the area of the inlet through which water can enter the duct arrangement at a given speed. Without wishing to be restricted to theory, the effective inlet area is thought to reduce as speed increases since the higher momentum of the water at high speeds prevents the water from entering the relatively shorter lateral portions. Other hydrodynamic effects resulting from the shape of the inlet may also affect the effective inlet area at a given speed.

At least part of the main portion may extend upstream of the lateral portion.

The ratio between the length of the main portion along the principal axis and the lateral portion along the principal axis is between 2:1 and 3:1. The ratio between the width of the main portion at its widest point and the width of the lateral portion at its widest point may be approximately 1:1.

The duct arrangement may comprise two lateral portions, one on each side of the main portion. In this way, water can be blocked from entering the duct from either side of the duct relative to the principal axis at high speed, and can enter from either side of the duct at low speed.

The width of the main portion may taper along the principal axis, and the width of the main portion may taper from a maximum downstream in use of a minimum. Such a shape may improve the efficiency (i.e. reduce the pressure loss) of the intake at high speeds.

The duct arrangement may define an upper wall which may slope upwardly from an upstream in use end of the duct toward a downstream in use end of the duct along the principal axis. Such an arrangement reduces the turning required for water to enter the inlet from the forward direction, and thereby reduces cavitation within the duct at high speeds, thereby increasing efficiency.

A downstream end of the or each lateral portion may extend downstream relative to a downstream end of the main portion. By locating a downstream end of the lateral portion downstream of the downstream end of the main portion, the effective inlet area at low speeds is further increased, while the effective inlet area at high speeds is substantially unaffected. This is because additional water approaching the inlet from the rearward direction is able to pass into the lateral portions at low speed, while water approaching from the forward direction is prevented from entering the duct due to the excessive turning that would be required.

The duct arrangement may comprise an impeller duct inlet located downstream of the main duct, wherein the impellor duct inlet may have approximately the same width perpendicular to the principal axis as the main portion.

The duct arrangement may comprise at least one divider located between the main and lateral portions. The or each divider may be arranged to at least partially block water flow between the main and lateral portions. By providing a divider to block water flow between the main and lateral portions, the effective intake area of the duct can be controlled to a greater extent.

The or each divider may extend upwardly from the inlet, part way to the upper in use wall. The or each divider may be moveable from at least a first retracted position, wherein the divider blocks water flow between the main and lateral portions to a first extent, and a second, deployed position, wherein the divider blocks water flow between the main and lateral portions to a second, greater extent. The or each divider could be rotatable about a horizontal or vertical axis, and may be rotatable such that the divider is alignable with the flow direction entering the inlet. The or each divider may be arranged to be moveable by a pressure difference between the main and respective lateral portions.

The arrangement may comprise an inflatable member disposed in a position such that the geometry of the inlet can be altered by the inflation or deflation of the inflatable member between at least a first configuration and a second configuration. The inflatable member may be located within one or more of the or each lateral portions.

The duct arrangement may further comprise an auxiliary duct having an auxiliary inlet aperture arranged to be submerged in use and an auxiliary outlet that opens into the main duct. Such an arrangement can provide further increased effective intake area at low speeds.

According to a second aspect of the present invention, there is provided a waterjet propulsor comprising a duct arrangement according to the first aspect of the invention.

According to a third aspect of the invention, there is provided a water vessel comprising a waterjet propulsor according to the second aspect of the invention.

The present invention will be more fully described by way of example with reference to the accompanying drawings, in which:

DETAILED DESCRIPTION

Figure 1:
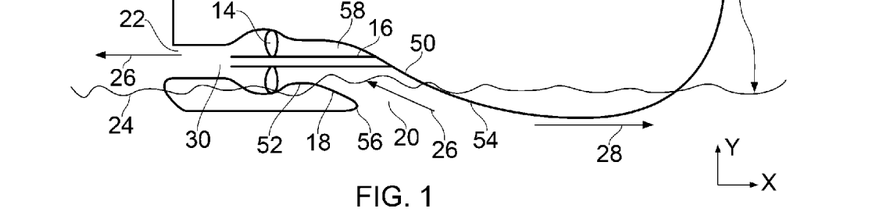
FIG. 1 is a sectional side view of a first duct arrangement installed in a water vessel.

FIG. 1 shows a water vessel 100 comprising a hull 12. Generally, the water vessel is a water vessel designed for high speeds, such as a motor yacht or military vessel. The water vessel 100 is powered by a waterjet propulsor 10 comprising a pump such as an impellor 14 driven by a shaft 16. The shaft 16 is in turn driven by a motor such as an electrical motor or internal combustion engine (not shown). In alternative arrangements, the impellor could be driven by means other than a shaft, for instance the impellor could be a rim driven thruster. In rim driven thrusters, the blades of the impellor act as the rotors of an electrical motor, while the housing (i.e. the rim) acts as the stators. In a still further alternative, the impellor could be in the form of a centrifugal pump. The waterjet propulsor 10 further comprises a duct arrangement 18 defined by the hull 12, in which the impellor 14 is housed.

The duct arrangement 18 comprises a main duct 30 having an inlet 20 and an outlet 22. The inlet 20 is located beneath a waterline 24 of the vessel 100 in use (i.e. when the vessel 100 is floating in the water), and the outlet 22 is located above the waterline 24 in use. The impellor 14 is driven by the shaft 16 such that water is drawn in to the duct arrangement 18 through the inlet 20 from underneath the hull 12. The water then travels through the duct arrangement 18 generally rearwardly in the direction shown by arrows 26, and is expelled through the outlet 22 above the waterline 24, thereby forming a jet of water above the waterline 24.

As water is expelled through the outlet 22, the reactive force of the jet of water provides a propulsive force which acts in a generally forward direction as shown by the arrow 28, i.e. opposite to the direction of flow of the water expelled through the outlet 22. The water vessel 100 is thereby driven forward.

The inlet 20 is shown in further detail in FIGS. 2 and 3, which each show a view from below of the inlet 20 of the main duct 30. The inlet 20 has an elongate main portion 32 extending along a principal axis 34. The elongate main portion 32 is bounded on either side by a lateral portion 36 in fluid communication with the main portion 34.

Each lateral portion 36 is elongate, and extends part way only along the length of the main portion 32, generally parallel to the principal axis 34. In the embodiment shown in FIG. 2, the main portion 32 extends forwardly and rearwardly (i.e. upstream and downstream in use) of each lateral portion 36, and is about 1.5 to 2 times the length of each of the lateral portions 36. In some embodiments, the main portion 32 could be between 2 to 3 times the length of each of the lateral portions 36.

The main duct 30 comprises an upper wall 50 and a lower wall 52. The upper wall defines a forward end 54 of the inlet 20, and slopes upwardly relative to an in use orientation in a downstream direction along the principal axis. The lower wall 52 defines a rearward end of the inlet 20 in the form of a lip 56.

The main portion 32 has a length which is greater than each of the lateral portions 36, and has a maximum width perpendicular to the principal axis 34 which is substantially equal to the maximum width perpendicular to the principal axis of each of the lateral portions 36. The main portion 32 comprises a forward end which extends in an elliptical curve from a minimum at an upstream end 40 to a maximum where the edge of the main portion 32 meets an upstream edge 44 of each of the lateral portions 36. The side edge of the main portion 32 extends rearwardly from the upstream edge 44 of each of the side portions along a notional line 37 which defines the notional edge between the main 32 and lateral 36 portions to a downstream edge 46 of each of the lateral portions 36. The line 37 runs generally parallel to the principal axis 34. The main portion is generally symmetrical about a line perpendicular to the principal axis 34 midway between the upstream 40 and downstream 42 edges, such that the main portion 32 tapers in an elliptical curve from a maximum where the main portion 32 meets a downstream edge 46 of each of the lateral portions 36, to a minimum at a downstream end 42 where the inlet 20 meets the lip 56.

Each of the lateral portions 36 is located laterally of the main portion 32, and is defined by the line 37, and the outline of the inlet 20. Each lateral portion 36 is also tapered in an elliptical curve from a minimum at the upstream and downstream edges 44, 46 to a maximum approximately midway therebetween.

The inlet 20 is in fluid communication with a downstream portion 58 of the duct arrangement 18 defined by the upper and lower walls 50, 52, which leads to the impeller 14. The downstream portion 58 has a generally circular cross section, and has a diameter similar to the width of the main portion 32 of the inlet 20. The shape of the duct arrangement 18 curves to provide a smooth transition from the inlet 20 to the downstream portion 58.

Figure 4:
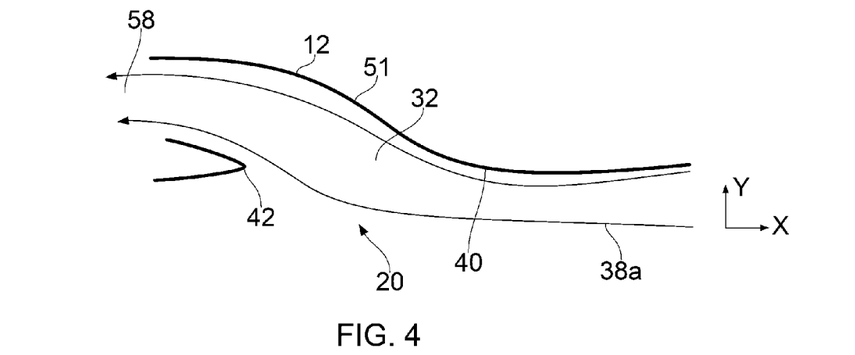
FIG. 4 is a sectional side view of the duct arrangement of FIG. 1 through a principal axis.

FIG. 4 shows a sectional view of the inlet 20 through the principal axis 34 (i.e. part of the main portion 32) when viewed from a side of the vessel 100. The upper wall 50 defines the upstream edge 40 of the main portion 32. The upper wall 50 curves upwardly from the upstream edge 40 to a point of inflection 51 approximately midway between the upstream edge 40 and the lip 56. The upper wall 50 curves downwardly from the point of inflection 51 to a downstream end 53. Such a curvature has been found to provide minimal suction losses at the speeds at which the vessel 100 typically operates.

Figure 3:
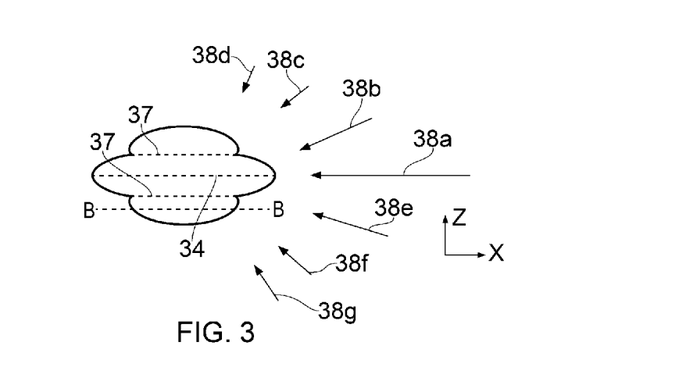
FIG. 3 is a view from below of the duct arrangement of FIG. 1 at a high speed condition.
Figure 5:
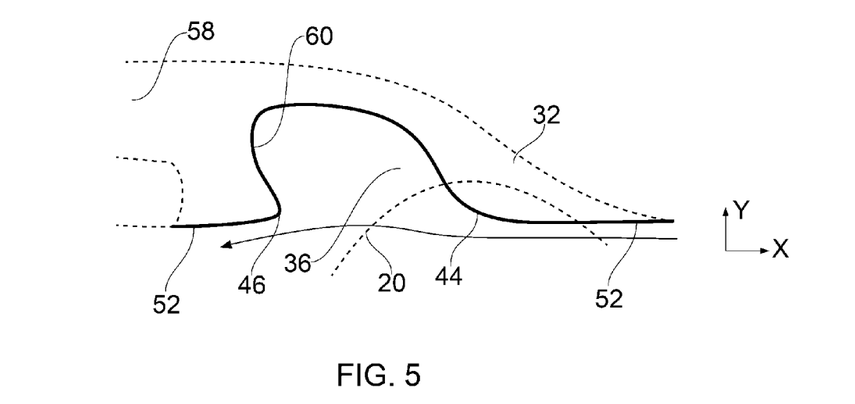
FIG. 5 is a sectional side view of the duct arrangement of FIG. 4 through section BB of FIG. 3 at a high speed condition.

FIG. 5 shows a sectional view of the inlet 20 through the line BB of FIG. 3 (i.e. one of the lateral portions 36) when viewed from the side of the vessel 100. The solid line shows the outline of the lateral portion 36, while the dotted line shows the outline of the main portion 32 for comparison. The upper wall 50 curves upwardly in a convex curve from the upstream edge 44 of the lateral portion 36 to a point of inflection 39 located downstream of the upstream edge 44. The upwardly curving region between the upstream edge 44 and the point of inflection 39 curves more tightly (i.e. has a smaller radius of curvature) than the upwardly curving region of the main portion 32. The upper wall 50 curves in a concave curve between the point of inflection 39 and the downstream edge 46 to form an upward bulge in the upper wall 50. The upper wall 50 then curves in a tighter concave curve downwardly and slightly forwardly to form a rear wall 60. The rear wall 60 extends from the downstream end of the upper wall 50 to meet the lower wall 52, which defines the downstream edge 46 of the lateral portion 36. The lateral portions 36 are therefore open only at the inlet 20, and at the junction between the lateral portion 36 and main portion 32 (i.e. at the notional line 37), and do not therefore communicate directly with the downstream portion 58 of the duct arrangement, but only communicate via the main portion 32.

The duct arrangement can be made of any material suitable for water vessel construction. Examples include metallic materials such as steel and aluminium, polymers, and composite materials such as glass or carbon fibre reinforce plastic.

Water flows through the duct arrangement in use as follows. FIG. 2 shows water entering the inlet 20 from various angles as shown by arrows 38a-g when the water vessel 100 is at a low speed condition, i.e. where the water vessel 100 is stationary or moving at a low speed such as below 20 kilometers per hour. Direction 38a represents a forward direction parallel to the normal forward direction of travel of the vessel 100, direction 38d and 38g represent sideways direction at an angle from the forward direction, and directions 38b, 38c, 38e and 38f represent intermediate directions. The length of the arrows 38a-g represents the proportion of the water approaching the inlet 20 from that angle when the impellor 14 is in operation. As can be seen from FIG. 2, when the vessel is stationary or at a low speed, suction from the impellor 14 draws substantially equal proportions of water into the inlet 20 from each direction 38a-g.

Figure 2:
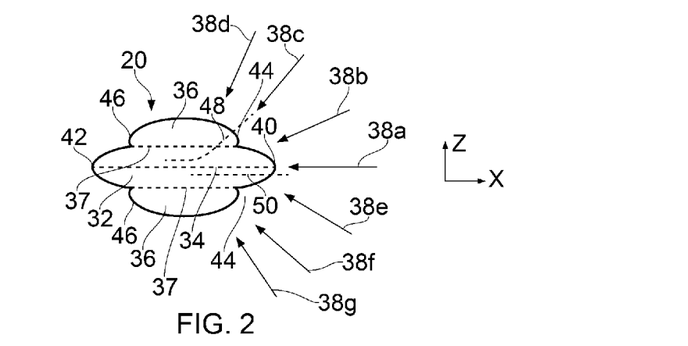
FIG. 2 is a view from below of the duct arrangement of FIG. 1 at a low speed condition.

FIG. 3 shows the inlet 20 of FIG. 2 at a high speed condition, i.e. where the vessel 100 is moving through the water at a higher speed than the low speed condition, i.e. substantially greater than 20 kilometers per hour. In this condition, a greater proportion of the water enters the inlet 20 from the forward direction 38a due to the higher momentum of the water coming from the forward direction 38a in the reference frame of the vessel 100.

FIG. 4 shows a sectional view of the inlet 20 through the principal axis 34 (i.e. part of the main portion 32), at either a low speed or a high speed condition. In order to enter the main portion 32 from the forward direction 38a, the water must change direction, i.e. "turn" to enter the inlet 20. When a fluid flow changes direction, a force is generated. The impellor 14 provides sufficient suction to draw in water against this force, such that water can enter the inlet 20 through the main portion 32. At high speed, the water is also forced in to the inlet 20 by the motion of the vessel 100.

Figure 6:
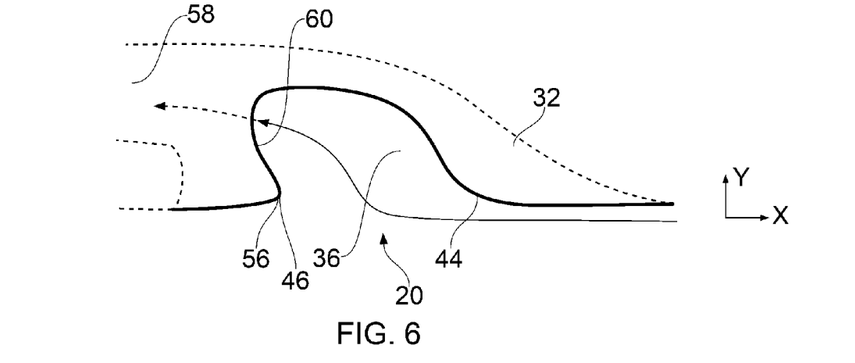
FIG. 6 is a sectional side view of the duct arrangement of FIG. 2 through section BB of FIG. 3 at a low speed condition.

FIG. 6 shows a sectional view of the inlet 20 through the line BB of FIG. 3 (i.e. part of one of the lateral portions 36) at a low speed condition. The outlines of the main portion 32 and the downstream portion 58 are shown in dotted lines for comparison. Due to the rear wall 60, water entering the inlet 20 through the lateral portions 36 must flow through the main portion 32 to reach the downstream portion 58. Water is shown entering the inlet 20 from the forward direction 38a. However, since the lateral portion 36 has a reduced length along the principal axis 34 relative to the main portion 32, the water has to turn upwardly as shown in FIG. 6 more sharply in order to enter the inlet 20 in comparison to water entering the main portion 32, i.e. the radius of curvature of the turn is smaller. As a result of the rear wall 60, the water must also turn inwardly toward the principal axis in order to enter the main portion 32 in order to subsequently flow to the downstream portion 58. As a result of each of these effects, a greater force is required to draw water into the inlet 20 through the lateral portions 36 relative to the main portion 32 where the water is approaching the inlet 20 from the upstream direction 38a. On the other hand, water entering the lateral portions 36 from the sideways direction 38g will have to turn to a lesser extent relative to water entering from the forward direction, and so a smaller force is required to draw water into the inlet from the sideways direction 38g.

FIG. 5 shows a sectional view of the inlet 20 through the line BB of FIG. 3 (i.e. one of the lateral portions 36) at a high speed condition, i.e. where the vessel 100 is travelling through the water at a higher speed compared to the low speed condition shown in FIG. 6. Again, water is shown approaching the inlet 20 from the forward direction 38a. However, in this case, since the water approaching from the forward direction 38a has a higher momentum in the reference frame of the vessel 100, the impellor 14 is unable to provide sufficient suction to turn the water to a sufficient extent to allow water to enter the lateral portion 36 from the forward direction 38a, and so the water from the forward direction 38a bypasses the lateral portions 36. On the other hand, water approaching the main portion 32 from the forward direction 38a is still able to enter the inlet (as shown in FIG. 4). This is because the main portion 32 has a greater length along the principal axis 34, i.e. in the forward direction 38a, in comparison to the lateral portions 36, and so the impellor 14 is able to take in water through the main portion 32 at both high and low speeds.

Without wishing to be restricted to theory, it is also thought that the high velocity water travelling through the main portion 32 in high speed conditions causes a relatively high pressure in this region relative to the water within the lateral portions 36. This relatively high pressure within the main portion 32 is transmitted to the water in the lateral portions 36, which prevents water from entering the lateral portions 36. At very high speeds, the pressure within the main portion 32 may be high enough relative to the pressure in the lateral portions 36 and the free stream water such that water may flow into the inlet 20 through the main portion 32, and out of the inlet 20 through one or both of the lateral portions 36, as shown by the dotted arrow in FIG. 4. The lateral regions 36 will then act as a "spill", thereby further reducing the effective intake area of the duct arrangement 10.

Figure 17:
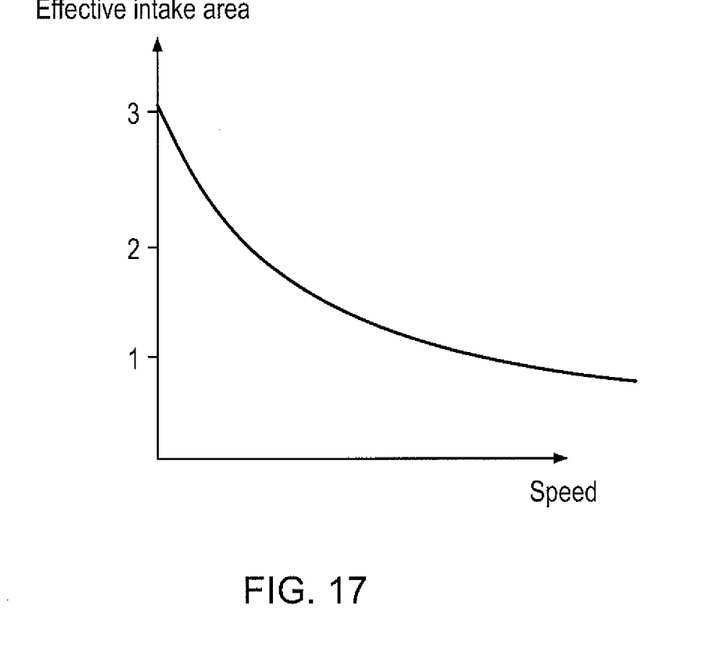
FIG. 17 is a graph plotting effective intake area against vessel speed.

As a result, at low speeds, the impellor 14 can draw water into the inlet 20 from both the main 32 and lateral 36 portions, and so the effective inlet area is the combined area of the main 32 and lateral 36 portions. However, at high speeds, the amount of water drawn into the inlet through the lateral portions 36 is reduced, until, at very high speeds, water is principally only drawn in through the main portion 32, and so the effective inlet area is the area of only the main portion 32. As a result, the effective inlet area is greater at low speeds than at high speeds. The above effect may vary in magnitude between low and high conditions, such that the effective inlet area can continuously vary between a large value at low speeds, to a small value at high speeds, as shown by the graph in FIG. 17.

A duct arrangement designed in accordance with the invention can therefore have an inlet 20 comprising a main portion 32 having dimensions (i.e. the width across the principal axis 34, length along the principal axis 34) which are optimal for high speeds. Since vessels typically spend long durations at high speeds, the present invention provides a duct arrangement which is highly efficient at high speeds, but has a sufficiently large effective intake area at low speeds to provide efficient operation at low speeds without encountering cavitation. This can in turn permit high thrust, and therefore high acceleration of the vessel 100 at low speed without damaging the impellor 14, or operating inefficiently. The invention may operate with fewer moving parts compared to variable geometry arrangements, thereby increasing reliability, and reducing maintenance costs. The reduction in moving parts exposed to the water flow also reduces the risk of damage to the duct arrangement 18 from foreign objects such as logs or other foreign debris. The spillage flow out of the lateral portions 36 of the inlet 20 at high speed can further reduce the net amount of water flowing into the inlet at high speeds, and so further increase efficiency at high speeds.

Figure 7:
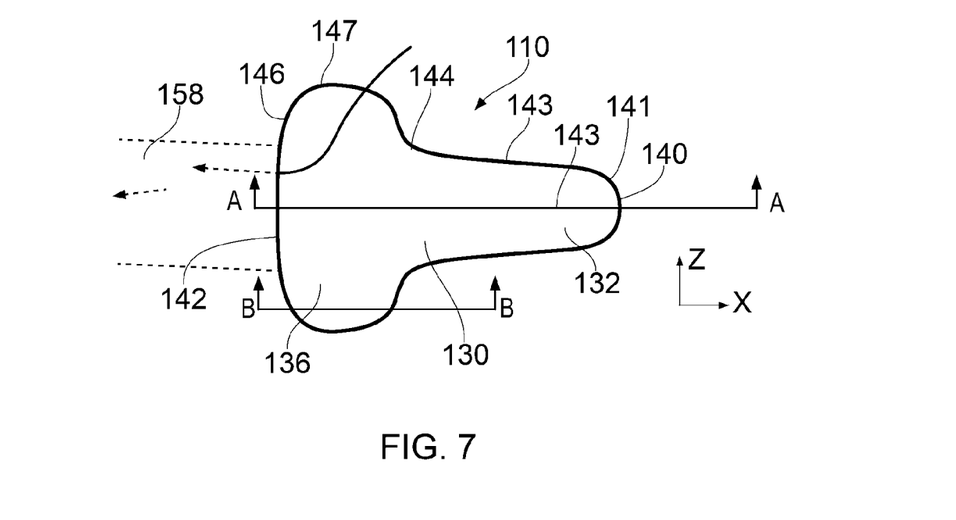
FIG. 7 is a sectional view from below of a second duct arrangement at a low speed condition.

FIG. 7 is a similar view to FIG. 2, but of a second duct arrangement 110 comprising a main duct 130 at a low speed condition. The main duct 130 comprises an elongate main portion 132 extending along a principal axis 134, and a pair of lateral portions 136 extending either side of the main portion 132. The dotted lines show a downstream portion 158 of the duct arrangement 110. However, each of the lateral portions 136 is arranged differently to the lateral portions 36 of the first main duct 30, and the relative sizes of the lateral portions 136 are also different.

The main portion 132 has a length extending between an upstream edge 140 and a downstream edge 142 along the principal axis 134. Each of the lateral portions 136 has a length extending along the principal axis between an upstream edge 144 and downstream edge 146. The length of the main portion 132 is approximately 3 times that of each of the lateral portions 136. The main portion 132 extends forwardly only of the lateral portions 136, but not rearwardly.

As a result of the larger length ratio between the main 132 and lateral 136 portions compared to the main 32 and lateral 36 portions of the first main duct 30, the lateral portions 136 become "blocked off" at lower speeds compared to the first main duct 130 for a given overall size. In general, the relative dimensions of the main and lateral portions 132, 136 will depend on vessel size and intended use. For example, for military vessels, vessels are often optimised for high efficiency at relatively low speeds, as high speed is only required for short periods. This may result in a design with a relatively small ratio of main and lateral portion 132, 136 lengths.

The main portion 132 comprises a blunt upstream edge 141 when viewed from below. The upstream edge 141 leads to a convexly outwardly and rearwardly curving front portion 141. The front portion 141 meets an outwardly tapering mid part 143 of the main portion 132, which in turn extends to an upstream edge 144 of each of the lateral portions 136.

The lateral portions 136 extend either side of the main portion 132, from an upstream edge 144 located at a downstream end of the mid part 143 of the main portion 132, to a downstream edge 146 adjacent the downstream edge 142 of the main portion 132. The lateral portions 132 curve outwardly from the upstream edge 144 to a side edge 147, before curving inwardly to the downstream edge 142.

Figure 9:
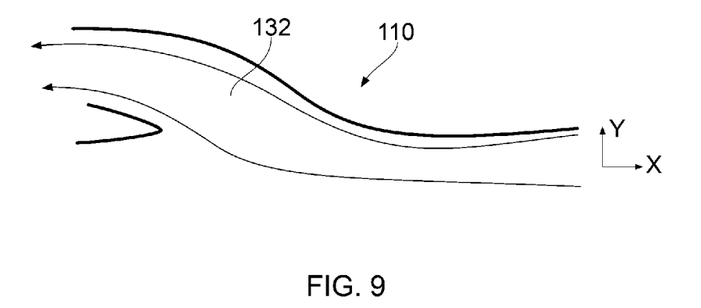
FIG. 9 is a sectional side view of the duct arrangement of FIG. 7 through section AA.

FIG. 9 is a similar view to FIG. 4, but of the second duct arrangement 110. The side profile of the main portion 132 is similar to that of the first duct arrangement 18.

Figure 10:
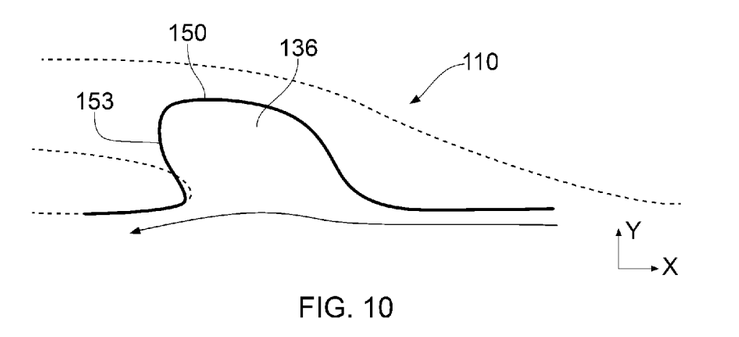
FIG. 10 is a sectional side view of the duct arrangement of FIG. 7 through section BB at a high speed condition.

FIG. 10 is a similar view to FIG. 5, but of the second duct arrangement 110. Again, the profile of the lateral portions 136 is similar, and comprises upper 150 and rear 153 walls. The rear wall 153 is located adjacent the downstream edge of the main portion 132.

As shown in FIG. 7, at low speeds, water approaching from the forward direction can enter the inlet 120 through both the lateral portions 136 and the main portion 132.

Figure 8:
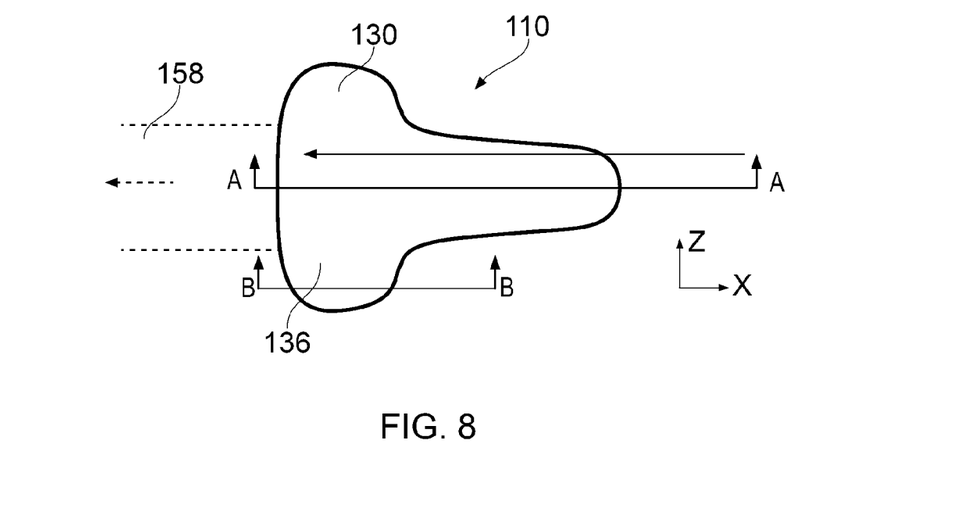
FIG. 8 is a sectional view from below of the second duct arrangement at a high speed condition.
Figure 11:
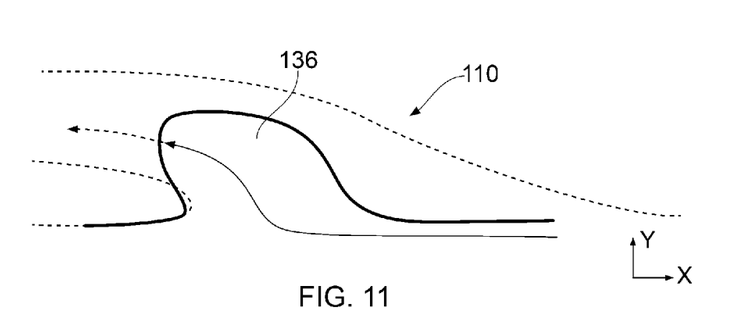
FIG. 11 is a sectional side view of the duct arrangement of FIG. 7 through section BB at a low speed condition.

However, at high speeds, as shown in FIG. 8, water can enter the inlet 120 only through the main portion 132. FIG. 9 shows a cross sectional view of the duct arrangement 110 through the principal axis, while FIGS. 10 and 11 show cross sectional views of the duct arrangement 110 through the line BB. FIG. 8 shows water entering the main portion 132 of the inlet 120 at either high or low speeds, while FIGS. 9 and 10 show the passage of water into the lateral portion 136 at high and low speeds respectively.

Figure 12:
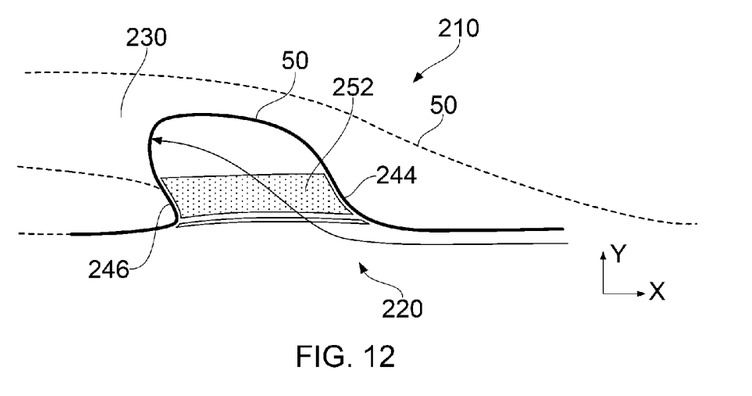
FIG. 12 is a similar view to FIG. 11, but of a third duct arrangement.
Figure 13:
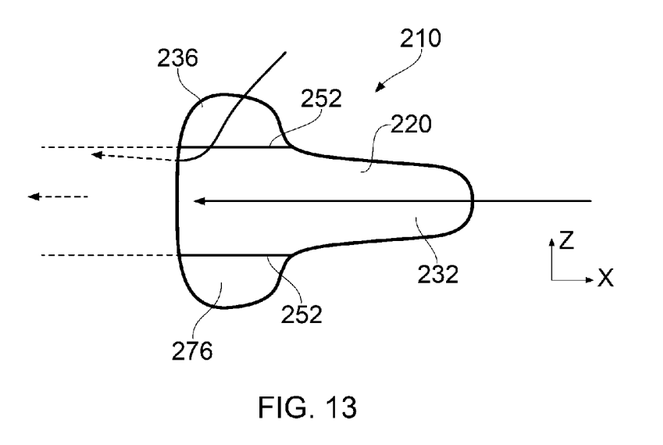
FIG. 13 is a view from below of the duct arrangement of FIG. 12.

FIGS. 12 and 13 are similar view to FIGS. 11 and 7 respectively, but show a third duct arrangement 210 having a main duct 230 comprising an inlet 220. The main duct 230 is similar to the main duct 130, and the inlet 220 is similar to the inlet 120. However, the duct arrangement 210 further comprises a pair of dividers 252. Each divider 252 is positioned in the main duct 230 between the lateral portions 236 and main portion 232 of the inlet 220. Each divider 252 comprises a generally planar sheet member, and extends from the opening of the inlet 220 part way to the upper wall 50, and extends along the lateral portion 236 from an upstream end 244 to a downstream end 246. The dividers 252 are substantially impermeable to water, and act to reduce turbulence and/or shear between the relatively stagnant water in the lateral portions 136 and the fast flowing water in the main portion 132 at high speeds, thereby reducing drag caused by the inlet 230. Since the dividers 252 only extend part way from the inlet 220 to the upper wall 50 however, some water can still flow over the top of the dividers 252, either from the lateral portions 236 to the main portion 232 at low speeds, or from the main portion 232 to the lateral portions 236 at high speeds.

However, at stationary and very low speeds, the relative speed between the water in the lateral portions 236 and 232 is smaller, and so less turbulence and shear will be encountered. Furthermore, since more water will enter the inlet 220 through the lateral portions 236 at low speeds, the dividers 252 may act to prevent sufficient water from entering the main portion 232 via the lateral portions 236. The dividers 252 could therefore be moveable between a retracted position, wherein the dividers 252 block water flow between the main 232 and lateral portions 236 to a first extent, and a deployed position (as shown in FIG. 12), wherein the dividers 252 block water flow between the main 232 and lateral portions 236 to a second, greater extent. The dividers 252 could be moved to the deployed position when the vessel 100 is at high speed, and to the retracted position at when the vessel 100 is at low speed.

Figure 14:
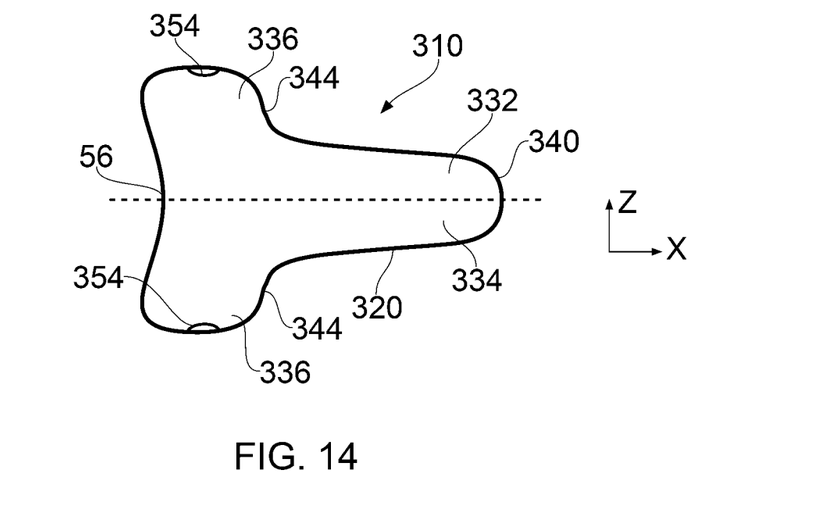
FIG. 14 is a view from below of a fourth duct arrangement in a deflated condition.

FIG. 14 is a similar view to FIG. 7, but of a fourth duct arrangement 310 comprising a main duct having an inlet 320 having main 332 and lateral 336 portions. The relative dimensions of the main 332 and lateral 336 portions of the inlet 320 are similar to the inlets 120, 220 of the second and third duct arrangements 120, 220, however the positions and shapes of the main 332 and lateral 336 portions are different.

As shown in FIG. 14, the main portion 332 is elongate, and extends along a principal axis 334 from an upstream end 340 defined by the upper wall 50, to a downstream end defined by the lip 56. Each of the lateral portions 336 also extend from respective upstream ends 344 defined by the upper wall 50 to respective downstream ends defined by the lip 56. The upstream ends 344 of each of the lateral portions 336 are located downstream of the upstream end 340 of the main portion 332. The lip 56 is also curved such that the downstream ends of each of the lateral portions 336 are located downstream of the downstream end of the main portion 336.

Optionally, the duct arrangement 310 may further comprise an inflatable member 354 located in each lateral portion 336. Each inflatable member 354 is disposed in a position such that the geometry of the inlet 320 can be altered by the inflation or deflation of the inflatable member 354 between at least a first configuration and a second configuration.

Figure 15:
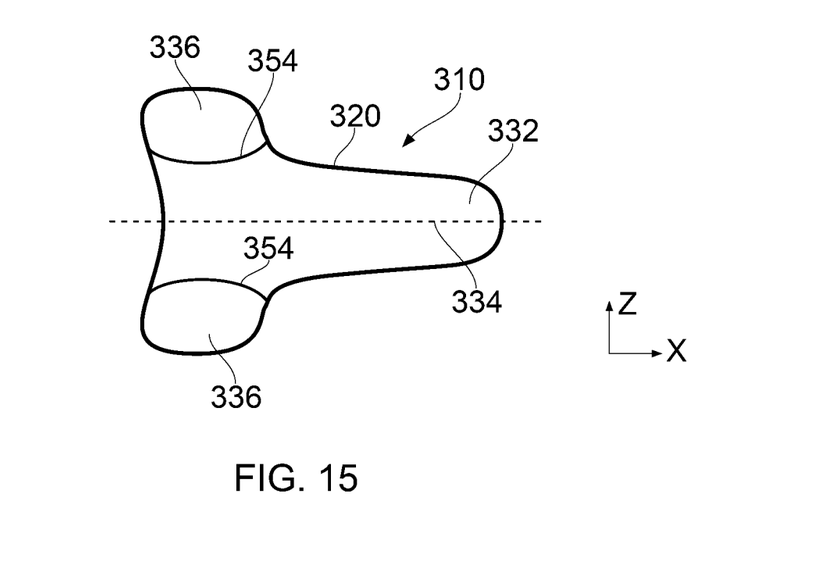
FIG. 15 is a view from below of the duct arrangement of FIG. 14 in an inflated condition.

The duct arrangement 310 is shown in the first, deflated condition in FIG. 14. The inflatable members 354 can be filled or drained of a fluid by a pump (not shown) such that the volume of the inflatable member 354 can be altered between the deflated condition shown in FIG. 14, to the inflated condition shown in FIG. 15. When the inflatable member 354 is inflated, it fills a larger part of the lateral portion 336 compared to when the inflatable member 354 is deflated. The inflatable members 354 therefore displace water within the lateral portions 336 when inflated, thereby reducing the effective inlet area. The inflatable members 354 can therefore provide additional control over the inlet area in comparison to other embodiments of the invention. Optionally, the inflatable members 354 could be installed in other embodiments of the invention.

Figure 16:
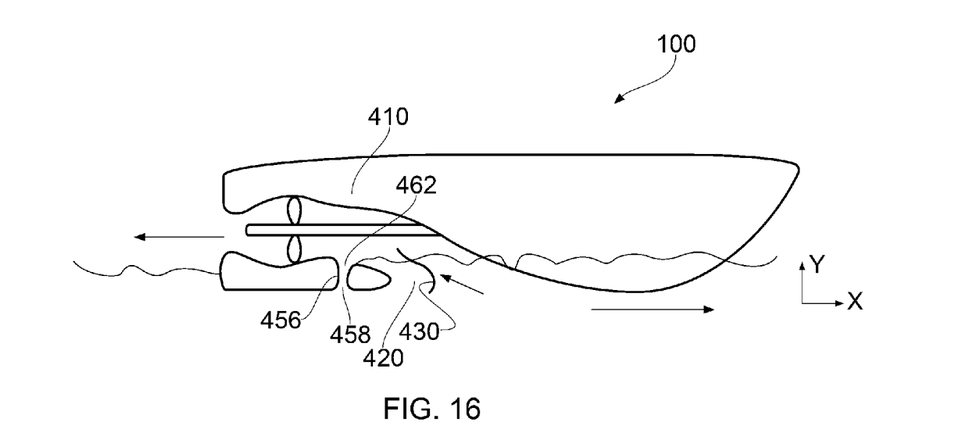
FIG. 16 is a cross sectional view of a vessel having a fifth duct arrangement.

FIG. 16 shows a similar view to FIG. 1, but of a vessel 100 having a fifth duct arrangement 410. The duct arrangement 410 is similar to any of the duct arrangements 10, 110, 210, 310, but in addition to a main duct 430, which is similar to any of the main ducts 30, 130, 230, 330, the duct arrangement 410 includes an auxiliary duct 456.

The auxiliary duct 456 extends from an inlet 458 located downstream of an inlet 420 of the main duct 430, to an outlet 462 which communicates with the main duel 430. The auxiliary duct can provide further effective intake area at low speeds compared to the duct arrangements 10, 110, 210, 310.

Figure 18:
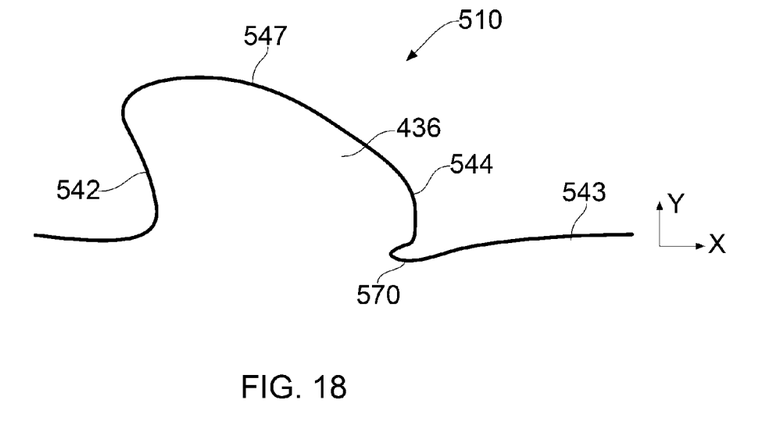
FIG. 18 is a cross sectional view from below of part of a fifth duct arrangement.

FIG. 18 shows a similar view to FIGS. 4, 10 and 12, but of a lateral portion 436 of a fifth duct arrangement 510.

The duct arrangement 510 comprise a main portion (only part of which is shown in FIG. 18) similar to that of the first duct arrangement 10. The lateral portion 436 comprises an upstream edge 544 which extends to downstream edge 542 via a side edge 547. The lateral portion 436 further comprises a lip portion 570, which extends between the upstream edge 544 of the lateral portion, and a mid part 543 of the main portion. The lip 570 extends from the upstream edge 544 to the mid part 543 in a downstream direction, such that the upstream edge 544 of the lateral portion 536 extends upstream of the junction between the lateral portion 436 and the main portion. The lip 570 reduces flow between the lateral portions 436 and main portion at high speed, thereby further increasing the ratio between the effective inlet area at high and low speeds.

The invention therefore provides a duct arrangement for a waterjet propulsor having a number of advantages over prior arrangements. The waterjet propulsor has a variable effective intake area which is automatically moderated in accordance with the forward speed of the vessel. The invention achieves this effect while reducing or negating the requirement for moving parts to provide the variable effective intake area. The invention is relatively low cost, as fewer moving parts are required compared to prior solutions. The invention can provide variable effective intake area with only a single inlet, which means that the inlet can be relatively robust. Since the lateral portions contribute less to the effective intake area at high speed, the shape of the lateral portions can be designed for high efficiency at low speed, and the shape of the main portion can be designed for high efficiency at high speed.

Various modifications could be made without departing from the invention. For example, although the outlet has been described as being located above the waterline in use, for certain applications the outlet could be located below the waterline. Unless otherwise stated, aspects of any of the described embodiments could be applied to other embodiments.

The invention claimed is:

1. A duct arrangement for a waterjet propulsor, for powering a water vessel, the duct arrangement comprising a main duct comprising an inlet for water, the inlet in use being located below a waterline of a water vessel, the inlet having an elongate main portion extending along a principal axis, and at least one lateral portion extending from a side of the main portion in fluid communication with the main portion, the at least one lateral portion extending part way only along the length of the main portion, wherein as seen from below the inlet in use a downstream end of the or each lateral portion extends downstream relative to a downstream end of the main portion.

2. A duct arrangement according to claim 1, wherein at least part of the main portion extends upstream of the lateral portion.

3. A duct arrangement according to claim 1, wherein the ratio between the length of the main portion along the principal axis and the lateral portion along the principal axis is between 2:1 and 3:1.

4. A duct arrangement according to claim 1, wherein the ratio between the width of the main portion at its widest point and the width of the lateral portion at its widest point is approximately 1:1.

5. A duct arrangement according to claim 1, wherein the duct arrangement comprises two lateral portions, one on each side of the main portion.

6. A duct arrangement according to claim 1, wherein the width of the main portion tapers along the principal axis.

7. A duct arrangement according to claim 6, wherein the width of the main portion tapers from a maximum to a minimum where the maximum is downstream from the minimum.

8. A duct arrangement according to claim 1, wherein the duct arrangement defines an upper in use wall, wherein the upper in use wall slopes upwardly from an upstream in use end toward a downstream in use end along the principal axis.

9. A duct arrangement according to claim 1, wherein the duct arrangement comprises an impellor duct inlet located downstream of the main duct, wherein the impellor duct inlet has a width perpendicular to the principal axis approximately the same as a width perpendicular to the principal axis of the main portion.

10. A duct arrangement according to claim 1, wherein the duct arrangement comprises at least one divider located between the main and lateral portions, wherein the or each divider is arranged to at least partially block water flow between the main and lateral portions.

11. A duct arrangement according to claim 10, wherein the or each divider extends upwardly from an intake aperture, part way to an upper wall of the duct arrangement.

12. A duct arrangement according to claim 10, wherein the or each divider is moveable from at least a first retracted position, and a second, deployed position.

13. A duct arrangement according to claim 1, wherein the arrangement comprises an inflatable member, wherein the inflatable member is disposed in a position such that the geometry of the inlet can be altered by the inflation or deflation of the inflatable member between at least a first configuration and a second configuration.

14. A duct arrangement according to claim 13, wherein an inflatable member is located within one or more of the or each lateral portions.

15. A duct arrangement according to claim 1, wherein the duct arrangement further comprises an auxiliary duct having an auxiliary inlet aperture arranged to be submerged in use and an auxiliary outlet that opens into the main duct.

16. A waterjet propulsor comprising a duct arrangement according to claim 1.

17. A water vessel comprising a waterjet propulsor according to claim 16.

18. A duct arrangement according to claim 1, wherein the inlet in use is on an underneath of a hull of a water vessel.

19. A duct arrangement according to claim 1, wherein the duct arrangement is defined by a hull of a water vessel.

20. A duct arrangement according to claim 1, wherein the inlet in use is flush with a submerged surface of a hull of a water vessel.

\* \* \* \* \*